Dec. 29, 1964        E. E. MONK            3,163,320
                 COMMUNION GLASS WASHER
Filed Sept. 10, 1962                    2 Sheets-Sheet 1
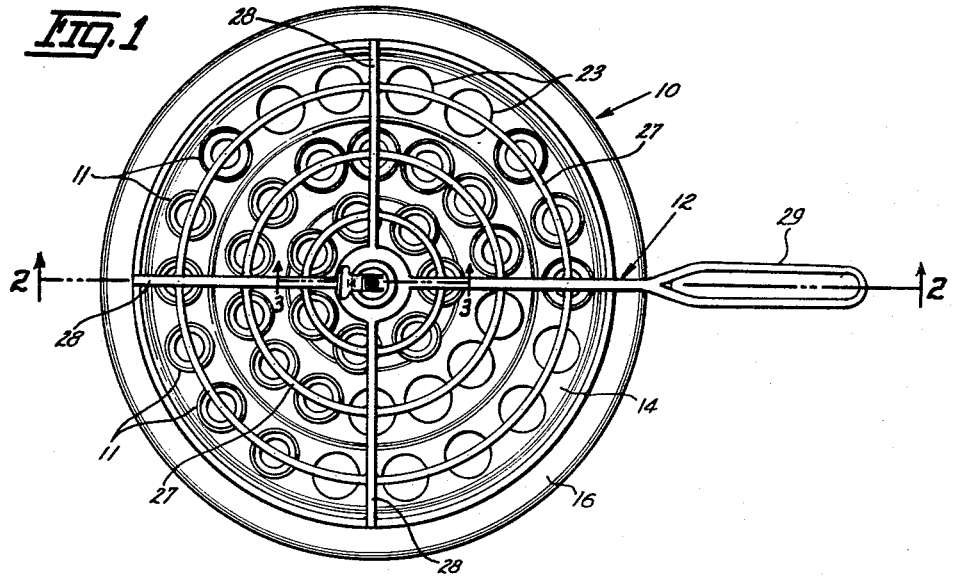
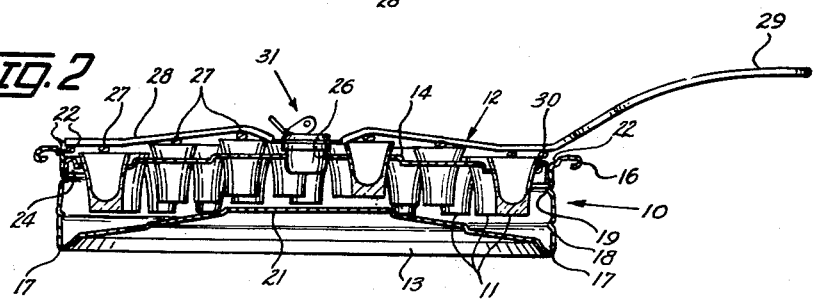
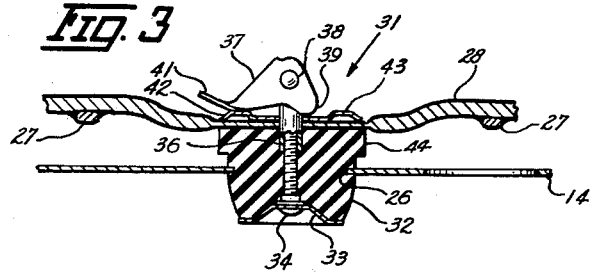
INVENTOR.
ELLIS E. MONK
BY Rudolph L. Lowell
ATTORNEY.

Dec. 29, 1964        E. E. MONK        3,163,320
COMMUNION GLASS WASHER
Filed Sept. 10, 1962                                    2 Sheets-Sheet 2
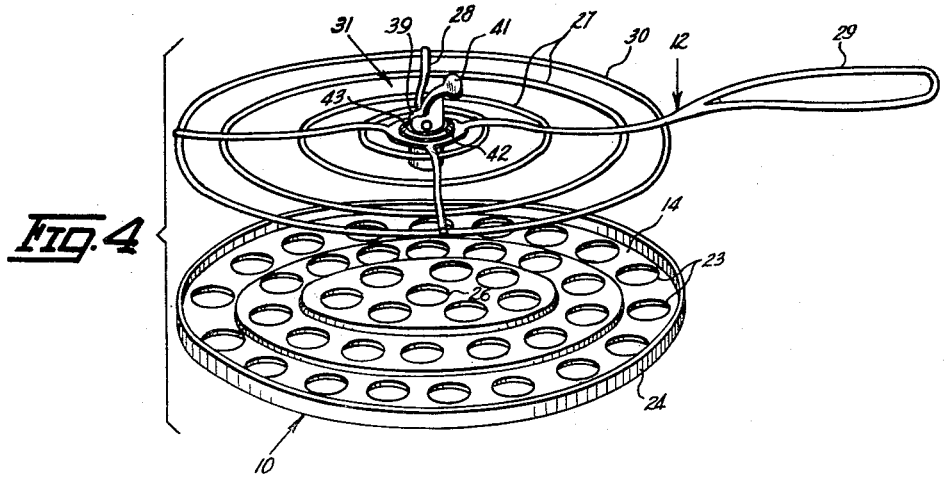
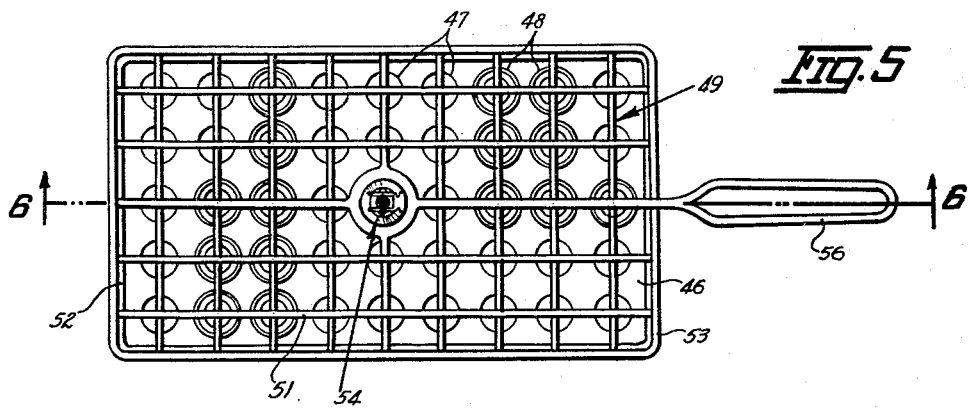
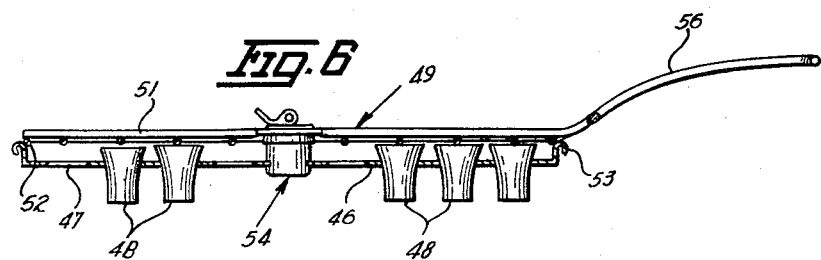
INVENTOR.
ELLIS E. MONK
BY Rudolph L. Lowell
ATTORNEY.

United States Patent Office 3,163,320
Patented Dec. 29, 1964

3,163,320
COMMUNION GLASS WASHER
Ellis E. Monk, 2540 E. University, Des Moines, Iowa
Filed Sept. 10, 1962, Ser. No. 222,598
6 Claims. (Cl. 220—102)

The present invention relates to an apparatus for handling small glasses and more particularly to a tray and holder for communion glasses.

An object of this invention is to provide an improved tray unit for holding communion glasses for washing and drying purposes.

Another object of the invention is to construct a communion glass tray and holder from a minimum number of separate parts.

A further object of the invention is to provide a unitary glass holder including separate handle and lock means for a communion glass tray.

Still another object of the invention is to provide a holder for a stepped communion glass tray which restrains the vertical movement of the glasses in the several vertical planes.

A further object of the invention is to provide a communion glass tray in combination with a removable and unitary holder for concurrently handling and washing a plurality of glasses.

Another object of the invention is to provide a communion glass tray with a glass holder which can be quickly and easily removed from the tray without disturbing or touching the glasses.

A further object of the invention is to provide a separable glass holder for a communion glass tray which when connected to the tray permits the tray to be turned and supported upside down allowing water to drain from the glasses.

Another object of the invention is to provide a compact, sanitary, relatively simple and inexpensive communion glass tray and holder which reduces the time and effort required to wash a plurality of the glasses.

According to the invention a communion glass tray having a removable glass supporting plate is provided with a removable holder to retain the glasses in the glass supporting plate by limiting the vertical movement of the glasses. The holder includes a releasable lock adapted to be connected to the plate, an open type frame to limit the vertical movement of each glass, and a separate handle for manipulating the glass supporting plate and holder as a unit. When the holder is locked to the glass supporting plate of the tray, the holder and all the glasses on the plate can be manipulated to concurrently wash the glasses and then moved into an inverted glass drying position.

The exact nature of the invention as well as other objects and advantages thereof will be readily apparent from the consideration of the following specification relating to the annexed drawing in which:

FIGURE 1 is a plan view of the communion glass tray and holder constructed according to the invention;

FIGURE 2 is a sectional view taken along the line 2—2 of the apparatus shown in FIGURE 1;

FIGURE 3 is an enlarged sectional view taken along the line 3—3 of the locking device connecting the tray with the holder of the apparatus shown in FIGURE 1;

FIGURE 4 is an exploded perspective view of the glass supporting portion of the tray and the glass holder of the apparatus shown in FIGURE 1;

FIGURE 5 is a plan view of a modified communion glass tray and holder; and

FIGURE 6 is a sectional view as seen along the line 6—6 of the apparatus shown in FIGURE 5.

Corresponding reference numbers indicated corresponding parts throughout the several views of the drawing.

Referring to the drawing, there is shown in FIGS. 1 to 4 a tray 10 supporting a plurality of small tapered glasses 11. The glasses are arranged in concentric circular rows and may be removed from the tray in a vertical direction. An open type frame 12 is releasably secured to the tray to limit the vertical movement of each glass 11. The frame or holder 12 and the glasses 11 are removable from a portion of the tray as a unit whereby the glasses may be simultaneously washed and stored.

The tray 10 has a cup-shaped base portion 13 telescoped with a perforated glass supporting plate or disc 14. The base 13 is formed with an outer peripheral bead 16 and an annular right angular seat 17. A downwardly directed wall 18 extends from the bead 16 to an annular supporting bead 19. The bottom surface 21 of the base 13 is concaved upwardly so that a plurality of trays may be stacked one on top of the other. The upper surface of the bead 16 is provided with an annular groove 22 adapted to receive the supporting bead of an adjacent tray.

The glass holding plate 14 of the tray is provided with a plurality of concentrically arranged rows of holes 23 adapted to receive separate glasses. The supporting plate 14 has a downwardly extending peripheral flange 24 which engages the right angular seat 17 of the base 13. The plate 14 is provided with an upwardly and inwardly stepped contour which positions the separate circular rows of glasses in different horizontal planes. The plate 14 is provided with a substantially centrally located hole 26 the purpose of which will be hereinafter explained in detail.

The holder 12 is formed with a spider web shaped frame having concentric annular rings 27 corresponding to the concentrically arranged rows of holes 23 in the plate 14. Each ring is positioned in different vertical planes to form a stepped frame conforming with the steps of plate 14. A plurality of radial members 28 interconnect the respective rings. A peripheral ring 30 positioned in substantially the same plane formed by an adjacent annular member interconnects the outer ends of the radial members 28 and has a diameter substantially equal to the diameter of the plate 14. The peripheral ring 30 functions as a guard for the outer circle of glasses to keep them from touching the supporting surface during draining and drying of the glasses. An upwardly and radially outwardly extended handle 29 forms an integral part of one of the radial members 28. The frame may be fabricated from welded wire members coated with a heat insulating plastic material.

A positive grip lock 31 is secured to the central portion of the frame of holder 12. As shown in FIGURE 3, the lock 31 includes a solid resilient member 32 secured to the lower portion of the frame by a cup-shaped washer 33 and a bolt 34. The bolt 34 is threaded into a vertically extended sleeve 36 which projects above the upper surface of the frame. A right angular shaped crank 37 is pivoted on a horizontally extended pin 38 mounted on the upper end of the sleeve 36. The crank 37 has a cammed surface 39 and a radially outwardly extended tongue 41.

The cammed surface 39 engages the upper surface of a pressure plate 42 positioned between the crank 37 and the upper surface of the frame. The pressure plate 42 has an annular extended peripheral ridge 43 which engages a portion of the tongue 41 when the crank 37 is in the locked position. This ridge provides clearance to enable the fingers of the operator to grip the tongue 41. When the crank 37 is in the locked position, the cam surface 39 is in an over-center position with respect to the axis of the pivot pin 38 and is urged in engagement with the pressure plate 42 by the force of the compressed resilient member 32.

As shown in FIGURE 4, the lock 31 is in the unlocked position, wherein the cammed surfaces 39 have been rotated clockwise out of the engagement with the pressure plate 42 thereby moving the sleeve 36 and bolt 34 in a downward direction. As a result the compressive force on the resilient member 32 is relieved thereby reducing its diametrical dimensions.

As shown in FIGURE 3 the resilient member 32 is inserted in the central hole 26 of the plate 14 and has an annular lip 44 to limit its downward movement with respect to the plate 14. The resilient member 32 can be retracted into locked engagement with the plate 14 along substantially its entire length thereby providing the holder with vertical adjustability with respect to the plate 14 which permits its use with glasses that have different heights.

The washing of a plurality of glasses positioned in the tray 14 is initially commenced by inserting the resilient member 32 in the center hole 26 of the plate 14. The tongue 41 of the lock 31 is then forced in a counterclockwise direction until it engages the pressure plate 42. The holder 12 being secured to the plate 14 by lock 31 limits the vertical movement of the glasses 11. Thus the holder 12, glasses 11, and the perforated plate 14 can be moved as a unit from the base 13 of the tray. The open construction of the spider web shaped frame enables the glasses to be thoroughly washed and rinsed. The position of the handle 29 of the holder 12 permits the glasses to be inserted in a stream of hot water and manipulated without the hand of the operator coming into contact with the hot water. After the glasses have been washed they are inverted, by turning the holder 12 upside down, and allowed to dry in the inverted position. After the glasses are dried they can be placed back into the base portion of the tray. The holder 12 may then be removed by releasing the lock 31.

Referring to FIGS. 5 and 6 there is shown a modified tray and holder for small glasses. The tray includes a removable flat and rectangular shaped plate 46 having a plurality of coordinately arranged holes 47, the number of holes and the diameter thereof being dependent on the size and type of glasses which are to be used with the tray. As shown in FIGURE 6 the glasses 48 are vertically disposed in the holes 47 of the plate 46.

The glasses 48 are retained in the tray 46 by a holder 49. The holder is formed from a rectangular grid frame 51 which is complementary to the coordinate dimensions of the holes 47 in the plate 46. The frame 51 is of a welded rod construction coated with a heat insulating material. The frame includes a member 52 which extends around the peripheral edge to interconnect the coordinate members of the frame. The member 52 engages an upwardly extending peripheral bead 53 of the plate 46. A positive grip lock 54 substantially identical to the lock 31 shown in FIGURE 3 is secured to the central portion of the frame and extends through the central hole of the plate 46 and functions to releasably secure the holder 49 to the plate 46.

As shown in FIGURE 6, when the lock 54 is in operative engagement with the plate 46 the peripheral frame member 52 engages the bead 53 to provide the unit with stability. A handle 56 integrally secured to the frame 49 extends outwardly from the peripheral edge thereof so that an operator may handle the tray and holder as a unit.

While there have been shown, described, and pointed out the fundamental novel features of the invention, it will be understood that various omissions, substitutions, changes in form, and details of the apparatus illustrated may be made by those skilled in the art without departing from the scope of the appended claims.

I claim:

1. An apparatus for supporting a plurality of tapering glasses comprising:
    (a) plate means having a plurality of spaced holes and an upwardly extending peripheral bead, each hole being adapted to engage a portion of a glass to limit the movement of the glass to one direction,
    (b) open frame means positioned over the plate means to retain the glasses in the plate means by limiting the movement of said glasses in said one direction, said frame means having a peripheral member adapted to engage the peripheral bead of the plate means, and
    (c) lock means secured to a portion of the frame means and extending toward the plate means for releasably connecting the frame means with the plate means and holding the peripheral member of the frame means in engagement with the peripheral bead of the plate means so that the plate means, frame means, and glasses can be handled as a unit, said lock means having an expansible and contractible diameter means which coacts with at least one of said holes in the plate means to attach the frame means to the plate means.

2. A holder for limiting the movement of a plurality of glasses positioned in a removable plate of a tray comprising:
    (a) frame means having a plurality of concentric annular members interconnected with radially extending arms, each annular member being adapted to engage a portion of the glasses positioned in the removable plate to limit the movement of the glasses in the plate,
    (b) lock means secured to the inner ends of the radially extending arms of the frame means, said lock means having an expansible diameter resilient element adapted to releasably engage the removable plate so that the frame means and the plate with the glasses thereon can be handled as a unit, and
    (c) handle means secured to the outer end of one of the radial extending arms of the frame means and extending radially outwardly from the frame means.

3. A holder for limiting the movement of a plurality of glasses positioned in a removable plate of a tray comprising:
    (a) frame means having a plurality of concentric annular members interconnected with radially extending arms, each annular member being adapted to engage a portion of the glasses positioned in the removable plate to limit the movement of the glasses in the plate, and
    (b) lock means secured to the inner ends of the radially extending arms of the frame means, said lock means having an expansible diameter resilient element adapted to releasably engage the removable plate so that the frame means and the plate with the glasses thereon can be handled as a unit.

4. A holder for limiting the movement of a plurality of glasses positioned in a removable stepped annular plate of a tray comprising:
    (a) frame means having a plurality of concentric annular members interconnected with a plurality of radially extending arms, each annular member being positioned in separate planes which extend substantially normal to the axis of the frame means, said annular members being adapted to engage a portion of glasses positioned in the stepped annular plate to limit the movement of said glasses, and
    (b) lock means secured to the inner ends of the radially extending arms of the frame means, said lock means having an expansible diameter resilient element adapted to releasably engage the removable plate so that the frame means and the plate with the glasses thereon can be handled as a unit.

5. The holder defined in claim 4 including:
    (a) handle means secured to the outer end of one of the radial arms of the frame means and extending radially outwardly from said frame means.

6. The holder defined in claim 4 wherein said frame means includes a concentric peripheral annular member positioned in substantially the same plane formed by the (References on following page)

adjacent annular member, said peripheral annular member being connected to the outer ends of the radial arms.

References Cited in the file of this patent

UNITED STATES PATENTS

| | | | |
|---|---|---|---|
| Re. 24,581 | Escaut | Dec. 23, | 1958 |
| 697,247 | Harris | Apr. 8, | 1902 |
| 1,061,026 | Thomas | May 6, | 1913 |
| 1,487,909 | Andrews | Mar. 24, | 1924 |
| 1,688,888 | Spreen | Oct. 23, | 1928 |
| 1,996,300 | Lindsay | Apr. 2, | 1935 |
| 2,704,928 | Curry | Mar. 29, | 1955 |
| 2,741,392 | Weiss | Apr. 10, | 1956 |
| 2,822,108 | Moeller | July 4, | 1958 |
| 2,904,288 | Krauss | Sept. 15, | 1959 |
| 2,970,700 | Lacy | Feb. 7, | 1961 |